US008589526B2

(12) United States Patent
Sato et al.

(10) Patent No.: US 8,589,526 B2
(45) Date of Patent: Nov. 19, 2013

(54) INFORMATION PROCESSING APPARATUS THAT REGISTERS INFORMATION ON IMAGE PROCESSING JOB IN DATA SERVER, METHOD OF CONTROLLING THE SAME, AND STORAGE MEDIUM

(75) Inventors: Junji Sato, Kawasaki (JP); Nobuyuki Shigeeda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 598 days.

(21) Appl. No.: 12/818,499

(22) Filed: Jun. 18, 2010

(65) Prior Publication Data

US 2010/0332636 A1    Dec. 30, 2010

(30) Foreign Application Priority Data

Jun. 24, 2009    (JP) ................. 2009-149794

(51) Int. Cl.
*G06F 15/173*    (2006.01)
(52) U.S. Cl.
USPC .......................... 709/223; 358/1.15; 358/1.16
(58) Field of Classification Search
USPC ................................................... 709/223
See application file for complete search history.

(56) References Cited

U.S. PATENT DOCUMENTS

| 2006/0074840 | A1* | 4/2006 | Gava et al. ........................ 707/1 |
| 2006/0268332 | A1* | 11/2006 | Shimada ...................... 358/1.15 |
| 2007/0146823 | A1* | 6/2007 | Borchers et al. ............. 358/496 |
| 2008/0133560 | A1* | 6/2008 | Ferlitsch ...................... 707/101 |
| 2009/0027726 | A1* | 1/2009 | Kajikawa ..................... 358/1.16 |
| 2009/0103128 | A1* | 4/2009 | Maeda ........................ 358/1.15 |
| 2009/0119550 | A1* | 5/2009 | Shouno ........................... 714/47 |
| 2010/0002251 | A1* | 1/2010 | Tachibana ................... 358/1.15 |

FOREIGN PATENT DOCUMENTS

| CN | 1893526 A | 1/2007 |
| CN | 101355628 | 1/2009 |
| EP | 1 727 349 A2 | 11/2006 |
| JP | 5-290087 A | 11/1993 |
| JP | 2006-330939 A | 12/2006 |
| KR | 10-2006-0121718 | 11/2006 |

OTHER PUBLICATIONS

Office Action issued in counterpart Chinese Patent Application 201010213033.6 dated Mar. 16, 2012.
CN Office Action issued Aug. 15, 2012 for corresponding CN 201010213033.
Extended European Search Report issued in corresponding European Patent Application 10166679.0 dated Sep. 17, 2010.
KR Office Action issued Feb. 27, 2013 for corres. KR 10-2010-0059473.

* cited by examiner

*Primary Examiner* — Hamza Algibhah
(74) *Attorney, Agent, or Firm* — Rossi, Kimms & McDowell LLP

(57)    ABSTRACT

An information processing apparatus which enables reduction of the capacity of a data server. An intermediate server receives audit information concerning a job executed by an MFP or PC. The intermediate server registers at least one of attribute information and content information contained in the received audit information, in the data server. A registration processing determination section of the intermediate server determines a type of the job which the received audit information concerns. The section causes a job information and content information registration section to register the attribute information and the content information contained in the received audit information in the data server, or a content information registration section to register the content information in the data server without registering the attribute information therein.

8 Claims, 12 Drawing Sheets

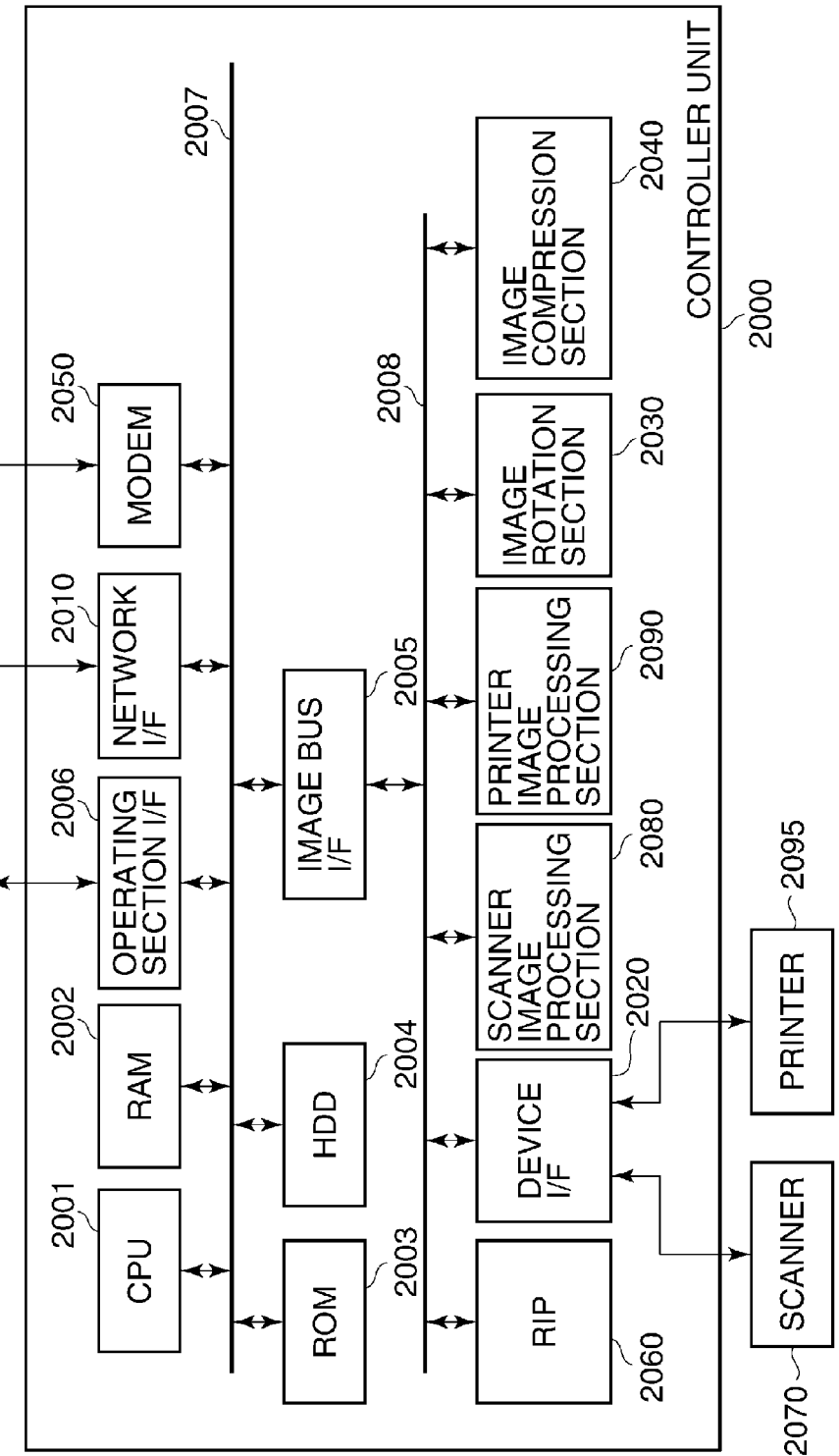

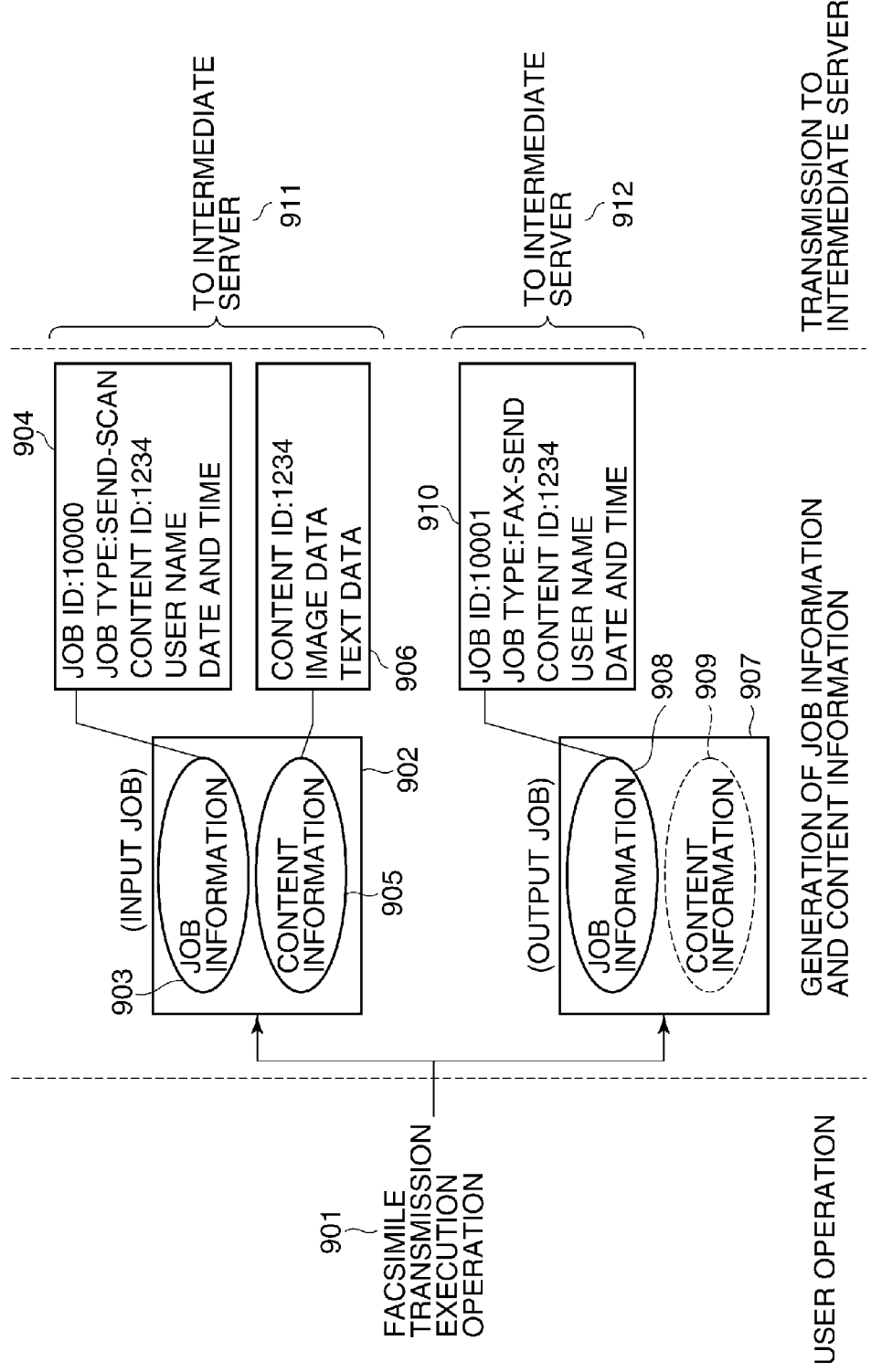

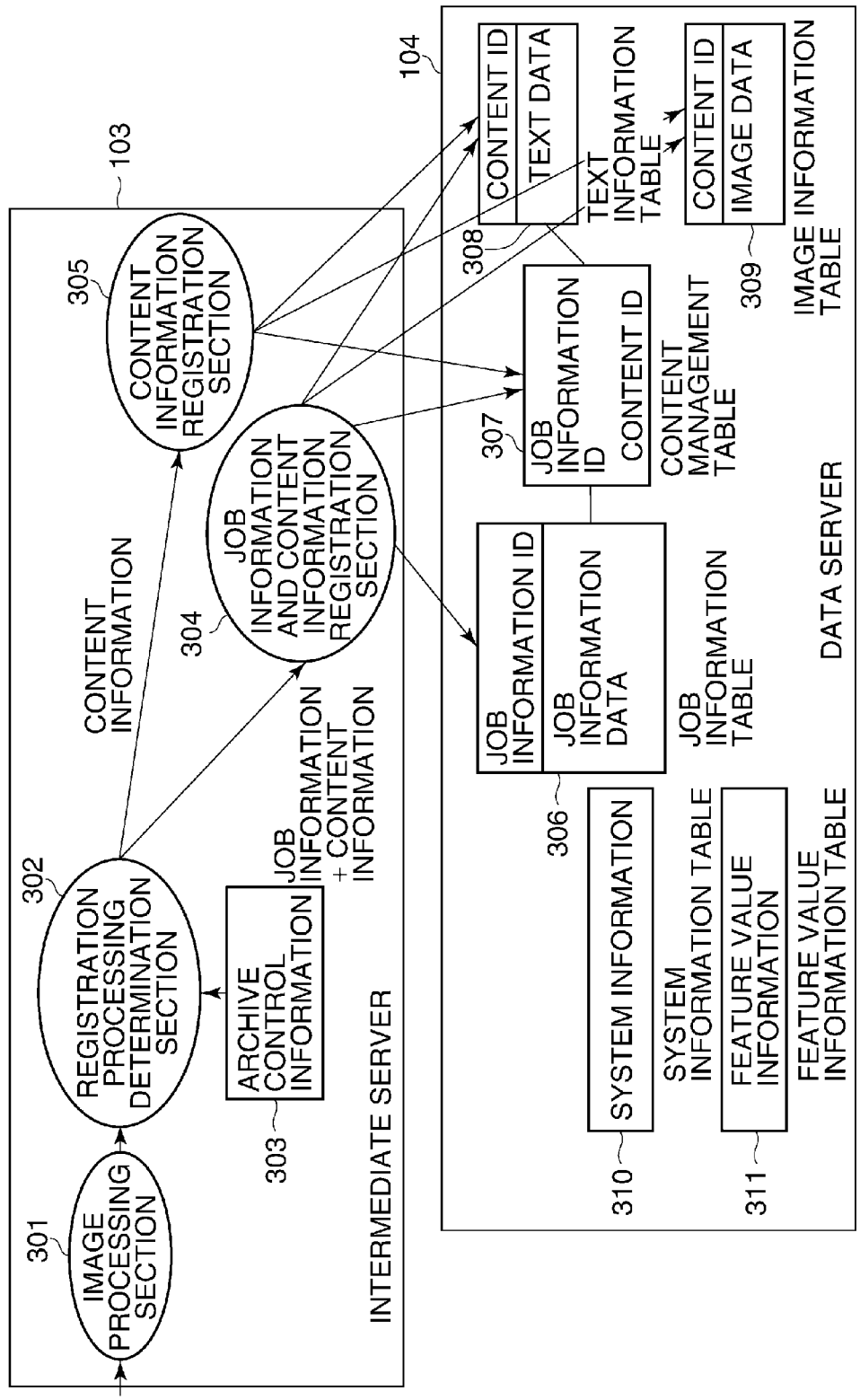

FIG.6

| JOB TYPE | | REGISTERED DATA CONTENT | | REGISTRATION SECTION |
|---|---|---|---|---|
| REGISTRATION TARGET JOB | LINK JOB | JOB INFORMATION | | JOB INFORMATION AND CONTENT INFORMATION REGISTRATION SECTION |
| | OTHER JOBS (INCLUDING SEND-SCAN) | JOB INFORMATION | CONTENT INFORMATION | JOB INFORMATION AND CONTENT INFORMATION REGISTRATION SECTION |
| NON-REGISTRATION TARGET JOB | LINK JOB | NONE | | NOT PROCESSED (DATA DISCARD) |
| | INPUT JOB (SEND-SCAN) | NONE | CONTENT INFORMATION | CONTENT INFORMATION REGISTRATION SECTION |
| | OTHER JOBS | NONE | NONE | NOT PROCESSED (DATA DISCARD) |

FIG.7

| INPUT JOB | OUTPUT JOB | ARCHIVE TARGET |
|---|---|---|
| SEND-SCAN | FAX-SEND | TARGET |
| SEND-SCAN | EMAIL-SEND | NON-TARGET |
| COPY-TO-BOX | FTP-SEND | NON-TARGET |
| ... | ... | ... |

INFORMATION PROCESSING APPARATUS THAT REGISTERS INFORMATION ON IMAGE PROCESSING JOB IN DATA SERVER, METHOD OF CONTROLLING THE SAME, AND STORAGE MEDIUM

BACKGROUND OF THE INVENTION

1. Field of the Invention

The present invention relates to an information processing apparatus that registers job information and content information on a job executed by an image processing apparatus, in a data server, and a method of controlling the information processing apparatus.

2. Description of the Related Art

Conventionally, there has been proposed a job record audit system that acquires job information and content information on jobs, such as copy jobs, facsimile transmission/reception jobs, and print jobs, which are executed by devices, such as printers, scanners, and multifunction peripherals (MFPs), on a job-by-job basis, and stores the job information and content information as a log, in a data server, for centralized management of log information (job records). In the job record audit system, it is possible to search the log information (job records) accumulated in the data server, including the job information and content information, to thereby refer to specific job information and content information.

For example, when a user uses a device, the device collects job information and content information as log records, on a job-by-job basis, i.e. for each of copy jobs, facsimile transmission/reception jobs, print jobs, etc., and sends the collected information to the data server. An administrator uses the job record audit system to search the job information and content information accumulated in the data server, using a keyword or an image, to thereby refer to log information associated with jobs the user caused the device to execute. This enables the administrator to audit whether or not the user properly uses the device.

Further, there has been proposed a job record audit system that records content information items associated with respective output jobs, such as facsimile transmission jobs and BOX print jobs, as a link log record describing a reference (link) to another content information item acquired in association with a scan job (input job) (see Japanese Patent Laid-Open Publication No. 2006-330939). Although each input job is always stored together with content information per se, an output job is stored together with a link record indicative of a link to content information, that is, only link information on the link to the content information associated with an input job is registered in a database (DB). Further, it is also envisaged that when transmitting content information from the device to the database, only a job record concerning a job which is set as an object to be registered is transmitted to the database for registration, to thereby reduce the storage capacity of the database.

However, in the above-described job record audit system, when the user desires to register a log of output jobs, such as facsimile transmission jobs, in the database, so as to use the log as an audit target, it is necessary to store a log (records) of input jobs, such as scan jobs, to which link records associated with the output jobs refer to. Therefore, when the administrator conducts an audit search, input job records out of the range of the audit target are also hit, which presents an obstacle to auditing.

On the other hand, there has been proposed a technique in which an application automatically configures conditions for allowing only records of output jobs set for registration to be hit, so as to display only necessary job records during a search (see e.g. Japanese Patent Laid-Open Publication No. H05-290087).

In the conventional job record audit systems described above, content information items associated with all jobs including copy jobs, facsimile transmission/reception jobs, and print jobs, executed by the device are acquired and registered in the data server. However, there is a demand to audit only job records associated with a specific job type (e.g. facsimile transmission jobs). This is because an information leakage-preventing effect can be obtained by setting, as an audit target, only job records associated with a type of jobs which are executed by a hardware device installed at a certain location with a high frequency or are likely to be at risk of information leakage (e.g. job records associated with facsimile transmission jobs). Further, by thus registering only job records associated with a specific job type, it is possible to reduce the storage capacity of the data server.

Furthermore, when using a job record audit system, it is desirable that an administrator searches job records associated with a specific job type. If job records of jobs of a job type which is not an audit target are registered in a data server, the administrator has to perform a complicated search operation on the data server.

In the systems disclosed in Japanese Patent Laid-Open Publications No. 2006-330939 and No. H05-290087, all job records are registered in the database without omission, which makes it impossible to achieve a reduction in the storage capacity, and complicates the search processing by the administrator.

SUMMARY OF THE INVENTION

The present invention provides an information processing apparatus which enables a reduction in the capacity of a data server, a method of controlling the same, and a non-transitory storage medium storing a computer-executable program for causing a computer to execute the method.

In a first aspect of the present invention, there is provided an information processing apparatus that is connectable to an image processing apparatus arranged to execute a plurality of types of jobs for processing images, and a data server, via a network, comprising a reception unit adapted to receive audit information concerning a job executed by the image processing apparatus, from the image processing apparatus, the audit information containing attribute information indicative of attributes of the job and content information on an image processed by the job, a registration unit adapted to cause at least one of the attribute information and the content information contained in the audit information received by the reception unit, to be registered in the data server, a determination unit adapted to determine a type of the job which the audit information received by the reception unit concerns, and a control unit adapted to control whether to cause the registration unit to cause the attribute information and the content information contained in the audit information received by the reception unit to be registered in the data server or to cause the registration unit to cause the content information to be registered in the data server without causing the attribute information to be registered therein.

In a second aspect of the present invention, there is provided a method of controlling an information processing apparatus that is connected to an image processing apparatus arranged to execute a plurality of types of jobs for processing images, and a data server, via a network, comprising receiving audit information concerning a job executed by the image processing apparatus, from the image processing apparatus, the audit information containing attribute information indicative of attributes of the job and content information on an image processed by the job, causing at least one of the attribute information and the content information contained in the audit information, to be registered in the data server, determining a type of the job which the received audit information concerns, and controlling whether to cause the attribute information and the content information contained in the audit information to be registered in the data server or to cause the content information to be registered in the data server without causing the attribute information to be registered therein.

In a third aspect of the present invention, there is provided a non-transitory computer-readable storage medium storing a computer-executable program for causing a computer to execute a method of controlling an information processing apparatus that is connected to an image processing apparatus arranged to execute a plurality of types of jobs for processing images, and a data server, via a network, wherein the method comprises receiving audit information concerning a job executed by the image processing apparatus, from the image processing apparatus, the audit information containing attribute information indicative of attributes of the job and content information on an image processed by the job, causing at least one of the attribute information and the content information contained in the audit information, to be registered in the data server, determining a type of the job which the received audit information concerns, and controlling whether to cause the attribute information and the content information contained in the audit information to be registered in the data server or to cause the content information to be registered in the data server without causing the attribute information to be registered therein.

According to the present invention, it is possible to reduce the storage capacity of the data server.

Further features of the present invention will become apparent from the following description of exemplary embodiments with reference to the attached drawings.

BRIEF DESCRIPTION OF THE DRAWINGS

FIG. 3 is a block diagram of the hardware configuration of a multifunction peripheral appearing in FIG. 1.

FIG. 4 is a diagram useful in explaining the flow of job information and content information transmitted from the multifunction peripheral to an intermediate server.

FIG. 5 is a schematic diagram showing the configuration of functional components that operate during registration of job information and content information.

FIG. 6 is a diagram of a list of processing contents to be executed by a registration processing determination section appearing in FIG. 5.

FIG. 7 is a diagram showing the contents of archive control information appearing in FIG. 5.

DETAILED DESCRIPTION OF THE EMBODIMENTS

The present invention will now be described in detail below with reference to the accompanying drawings showing embodiments thereof.

Figure 1:
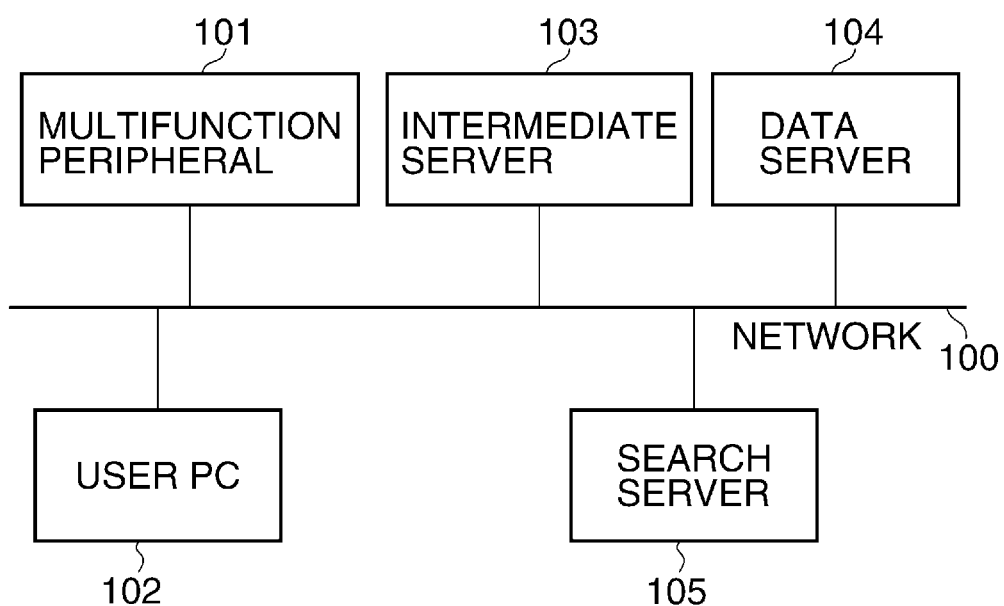
FIG. 1 is a schematic block diagram of a job record audit system including an information processing apparatus according to a first embodiment of the present invention.

FIG. 1 is a schematic block diagram of a job record audit system including an information processing apparatus according to a first embodiment of the present invention.

The job record audit system includes a multifunction peripheral (MFP) 101 as an example of an image processing apparatus, a user PC 102, an intermediate server 103, a data server 104, and a search server 105, all of which are interconnected via a network 100. The network 100 is a LAN (Local Area Network) operated within an office or a WAN (Wide Area Network) operated in a wide area over the Internet. Thus, the job record audit system comprises the network 100, and various kinds of devices including MFPs, PCs (personal computers), and servers, each connected to the network 100.

The MFP 101 is provided with an agent function. The agent function is used to acquire job information and content information from a job, such as a copy job or a facsimile transmission job, which is executed by the MFP 101 according to a user operation, and send the acquired information to the intermediate server 103. Job information is attribute information associated with a job which the user causes a device or a PC to execute. The job attribute information includes the type of a job (job type), the user ID of a user who gives an instruction for executing the job, job start date and time, and the name of an apparatus that executed the job.

The term "content information" is intended to mean image data and text data which are input (or output) along with execution of a job. Image feature value data extracted from the image data can be contained in the content information. Image feature value data comprises values that characterize an associated image, more specifically, values respectively indicative of a luminance information item, a color information item, an edge information item, and a value obtained from the respective values of these information items using a predetermined algorithm. The image feature value data is used when conducting a search for an image.

The user PC 102 has a printer driver that functions during a print process executed by application software. The user PC 102 also incorporates add-on software that expands the function of the printer driver. The add-on software acquires job information and content information concerning print data which are to be transmitted from the user PC 102 to the MFP 101. The job information and the content information acquired by the user PC 102 are transferred to the intermediate server 103 by agent software for the PC. The agent software may be installed in the user PC 102, or alternatively be installed in a print server, not shown, set up on the network 100.

The intermediate server 103 receives the job information and the content information transferred from the MFP 101 and the user PC 102, via the network 100. The intermediate server 103 performs data conversion processing on the received job information and content information, and data registration processing on the same for data registration in the data server 104. The data conversion processing includes image resolution conversion, data compression, data format conversion, text extraction by an OCR (Optical Character Reader), and extraction of image feature values for use in a search of an image. The intermediate server 103 registers data in the data server 104 using an ODBC (Open Database Connectivity) provider or another type of data provider.

The data server 104 is provided with a large-capacity storage formed by one or more HDDs (hard disk drives) on which a database (DB) is constructed. The database comprises one or more data tables having respective application-specific structures. The database is managed by a database management system (DBMS) operating on the data server 104 such that data consistency is guaranteed during registration, update, and search of data. The job information and the content information are stored in the data server 104 via the database management system.

The job information and the content information stored in the data server 104 can be referred to, using the search server 105. The search server 105 is constructed by a Web application, and a user accesses the search server 105 using a Web browser. When the user defines a search query so as to find job information and content information that the user desires to refer to, the search server 105 executes search processing based on the query. The result of the search is displayed on the Web browser used by the user for browsing, via the search server 105.

Although in the present embodiment, the intermediate server 103, the data server 104, and the research server 105 are constructed by respective different information processing apparatuses, all of these or one or two of them may be integrated in one information processing apparatus.

Figure 2:
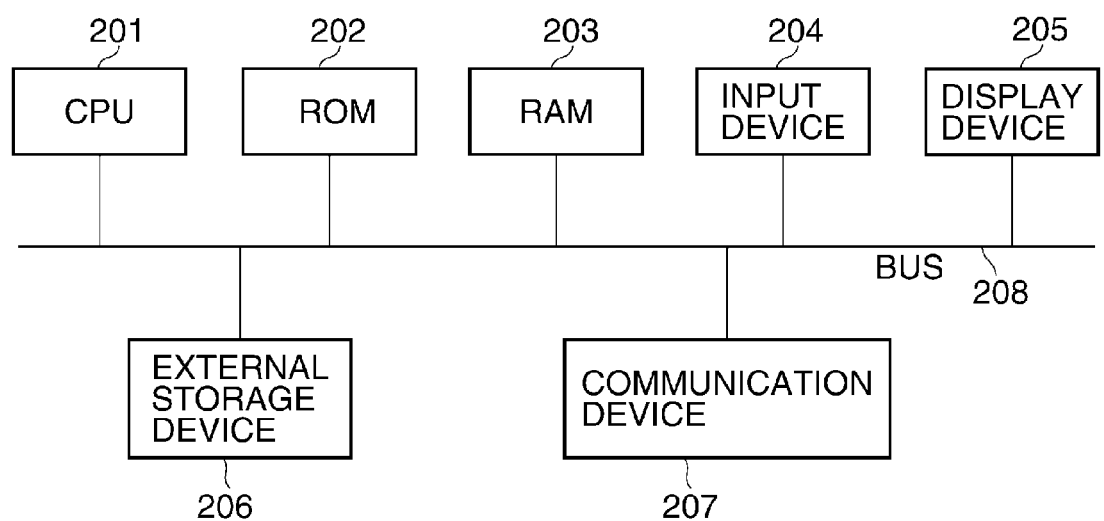
FIG. 2 is a block diagram of the hardware configuration of the information processing apparatus appearing in FIG. 1.

FIG. 2 is a block diagram of the hardware configuration of an information processing apparatus (PC or server) as a component of the job record audit system in FIG. 1.

In FIG. 2, a CPU 201 performs arithmetic operations for various kinds of data processing concerning acquisition of job records and for search, and provides control of components connected to a bus 208. A ROM 202 is a memory used exclusively for reading data stored therein. The ROM 202 stores basic control programs. A RAM 203 is a memory used for reading data therefrom and writing data therein. The RAM 203 is used for execution of various arithmetic operations by the CPU 201 and temporarily storing data.

An external storage device 206 is used as a temporary storage area for storing a system program of an operating system (OS) of the information processing apparatus, programs for the job record audit system, and currently processed data. The external storage device 206 takes more time for data input/output than the RAM 203 does, but is capable of storing a larger amount of data. The external storage device 206 is generally implemented by a magnetic storage device (HDD), but it may be a device configured to receive therein an external medium, such as a CD-ROM, a DVD-ROM, or a memory card, which is inserted therein, for data reading and recording.

An input device 204 is used to input characters and data to the information processing apparatus. The input device 204 comprises a keyboard and a mouse, neither of which is shown. A display device 205 is provided for displaying results of processing executed by the information processing apparatus. The display device 205 is implemented e.g. by a CRT or a liquid crystal monitor. A communication device 207 is connected to the LAN, and is used to perform TCP/IP data communication with other information processing apparatuses.

FIG. 3 is a block diagram of the hardware configuration of a device (MFP 101) as a component of the job record audit system in FIG. 1.

In FIG. 3, a controller unit 2000 is connected to a scanner 2070 as an image input device and a printer 2095 as an image output device. Further, the controller unit 2000 is connected to a LAN 2011 and a public communication line (WAN) 2051, for inputting/outputting image information and device information. The LAN 2011 and the public communication line 2051 correspond to the network 100 in FIG. 1.

In the controller unit 2000, a CPU 2001 executes various kinds of data processing concerning the acquisition of job records, and performs overall control of the system. A RAM 2002 is a system work memory used for operation of the CPU 2001, and also functions as an image memory for temporarily storing image data. A ROM 2003 is a boot ROM that stores a boot program for the system. An HDD (hard disk drive) 2004 stores system software and image data.

An operating section interface (I/F) 2006 provides interface with an operating section (UI) 2012 having a touch panel. The operating section interface 2006 outputs data to the operating section 2012 so as to cause the data to be displayed thereon. The operating section interface 2006 also transfers information input by a user of the present system via the operating section 2012 to the CPU 2001.

A network interface (I/F) 2010 is connected to the LAN 2011, for input and output of information. A modem 2050 is connected to the public communication line 2051, for input and output of information. The above-mentioned devices are connected to a system bus 2007. An image bus interface (I/F) 2005 is a bus bridge that connects the system bus 2007 to an image bus 2008 for high-speed transfer of image data, and performs data structure conversion. The image bus 2008 is implemented e.g. by a PCI bus or an IEEE 1394.

The following devices are provided on the image bus 2008. A raster image processor (RIP) 2060 rasterizes a PDL code into a bitmap image. A device interface (I/F) section 2020 connects the scanner 2070 and the printer 2095 as image input and output devices to the controller unit 2000, and performs synchronous-to-asynchronous or asynchronous-to-synchronous conversion of image data. A scanner image processing section 2080 corrects, manipulates, and edits input image data A printer image processing section 2090 performs correction, resolution conversion, etc. of image data for printout. An image rotation section 2030 rotates image data. An image compression section 2040 compresses multi-valued image data into JPEG data, and binary image data into JBIG, MMR, or MH-formatted data, as well as performs expansion of compressed data.

FIG. 4 is a diagram useful in explaining the flow of job information and content information generated during execution of a job by the MFP 101 and transmitted therefrom to the intermediate server 103. The illustrated example shows a case where a facsimile transmission execution operation 901 is performed as a user operation in the MFP 101. Further, it is assumed that operations appearing in FIG. 4 are achieved by reading a control program e.g. from the ROM 2003 and executing the control program by the CPU 2001 of the MFP 101.

The MFP 101 recognizes a facsimile transmission instruction issued by user operation, as a combination of a scan job for acquiring image data by scanning an original by the scanner 2070 and a facsimile transmission job for facsimile transmission of the acquired image data by the modem 2050. Job types are defined according to jobs that can be executed by the MFP 101. For example, the job type of a job for sending scanned image data by e-mail is defined as "email-send".

During execution of the scan job, the MFP 101 generates a job record 902 related to scanning (hereinafter also referred to as "the scan job-associated job record"). The scan job in the example in FIG. 4 will be referred to as "send-scan". The "send-scan" is a job for inputting data to the MFP 101, and therefore it is classified as an input job.

On the other hand, during execution of the facsimile transmission job, the MFP 101 generates a job record 907 related to facsimile transmission (hereinafter also referred to as "the facsimile transmission job-associated job record"). The facsimile transmission job in the example in FIG. 4 will be referred to as "fax-scan". The "fax-scan" is a job for outputting data from the MFP 101, and therefore it is classified as an output job. As described above, even when the user carries out a single operation (e.g. the facsimile transmission execution operation 901), the MFP 101 sometimes internally divides the single operation into a plurality of jobs of different types, for execution.

The job records 902 and 907 are audit information items stored in the data server 104 afterwards and used for audit purposes.

The job records 902 and 907 related to the respective jobs executed by the MFP 101 are generated by the MFP 101 and are then temporarily stored in the HDD 2004 of the MFP 101. Thereafter, the job records 902 and 907 are sent to the intermediate server 103 in predetermined timing, using the agent function operating on the MFP 101.

The scan job-associated job record 902 comprises job information 903 related to the attributes of the scan job and content information 905 which is data representing an image obtained by scanning. The job information 903 contains attribute information 904 associated with the scan job, such as a content ID "1234" for identifying the content information 905, the job type "send-scan", a user name, and a job start date and time. On the other hand, the content information 905 contains the content ID "1234", image data, and text data, as denoted by reference numeral 906 in FIG. 4. These will be described in detail hereinafter.

The job information 903 and the content information 905 constituting the job record 902 are associated with each other by the content ID. In the illustrated example, the content ID "1234" is stored in each of the job information 903 and the content information 905. The content ID stored in the content information 905 may be contained not in the content 906 of the content information 905, but in a file name (not shown) of a data file (not shown) thereof.

The facsimile transmission job-associated job record 907 comprises job information 908 related to the attributes of the facsimile transmission job. Image data for facsimile transmission is the same as contained in the content information 905 of the job record 902, and hence content information 909 of the job record 907 has no entity (actual content).

A content ID contained in the job information 908 constituting the job record 907 stores the same value as that of the content ID in the content information 905 acquired as the job record 902. Attribute information 910 of the job information 908 store the content ID "1234". The value "1234" of the content ID is identical to that of the content ID of the job record 902, which means that the content information 909 of the facsimile transmission job-associated job record 907 is identical to the content information 905 of the job record 902 related to the scan job. It should be noted that differently from the output job "fax-send" which is executed in combination with the input job "send-scan" as in the example in FIG. 4, if an output job only refers to the content information of an input job, such an output job is referred to as a link job.

When the facsimile transmission execution operation 901 is performed by the user, the MFP 101 generates the scan job-associated job record 902 as an input job and the facsimile transmission job-associated job record 907 as an output job. These job records (log information items) are sent to the intermediate server 103 by the agent function operating on the MFP 101 (911 and 912). The job records 902 and 907 are stored and managed as respective different job records in the data server 104.

When the data server 104 is searched by the search server 105 for the facsimile transmission job-associated job record 907, the facsimile transmission job-associated job record 907 registered as an output job is hit. At this time, the content 910 of the job information 908 contained in the facsimile transmission job-associated job record 907 is displayed as a search result. The content information 909 of the job record 907 has no entity, and hence the content 906 of the content information 905 contained in the scan job-associated job record 902 is displayed.

The other input jobs than the scan job include a job for executing a scanning operation and then storing scanned data in a box in the MFP 101 and a job for executing network printing according to an instruction issued from the user PC 102 and then also storing data used for the network printing in a box. On the other hand, the other output jobs than the facsimile transmission job include a job for sending data to an external device by e-mail and a job for sending data to a file server. Both of these output jobs are link jobs.

FIG. 5 is a schematic diagram showing the configuration of functional components that operate during data registration of job information and content information.

As shown in FIG. 5, the intermediate server 103 comprises an image processing section 301, a registration processing determination section 302, a job information and content information registration section 304, and a content information registration section 305, each of which operates as a functional component for realizing a data registration function. These functional components are software modules operating on the intermediate server 103.

The image processing section 301 performs image processing on content information received from the MFP 101. The image processing includes resolution conversion, data compression, and data format conversion. Further, the image processing section 301 is provided with a function of extracting image feature value data for quantitatively defining features of an image. This function is provided so as to conduct a search for an image (an image search) using image feature values.

Content information to be registered in the data server 104 via the job information and content information registration section 304 or the content information registration section 305 can contain image feature value data. When the image feature value data is contained in the content information, the image feature value data is stored as feature value information in a feature value information table 311 in the data server 104.

The registration processing determination section 302 identifies a job type (e.g. "send-scan") based on the content of job information received from the MFP 101, and switches between the functional components used for executing a data registration process for registering the job information and associated content information in the data server 104. The job information contains the attribute information 904 accompanying the job. The attribute information 904 includes the content ID, the job type, the user name, and the job start date and time, as described hereinabove. The job type is a keyword for identifying the type of a job issued by the user via the MFP 101. For example, when the user carries out the facsimile transmission execution operation 901 by the MFP 101, the two jobs, i.e. the job "send-scan" as a data scan job and the job "fax-send" as a facsimile transmission job are generated. Further, when the print process is executed from an application of the user PC 102, a job type called "print" is generated.

On the other hand, the content information contains image data and text data generated by the MFP 101 or the user PC 102. The text data may be generated by the MFP 101 or the user PC 102 or by executing OCR processing by the image processing section 301 of the intermediate server 103.

During transfer over the network, the job information and the content information are associated with each other as objects processed for a network session. In the intermediate server 103, the job information and the content information are associated with each other by being stored in the same folder.

Archive control information 303 in the intermediate server 103 is a rewritable file in which types of information to be registered in the data server 104 are defined. The registration processing determination section 302 refers to a job type identified by the received job information and the archive control information 303, and causes either the job information and content information registration section 304 or the content information registration section 305 to execute the data registration process. Although in FIG. 5, the job information and content information registration section 304 and the content information registration section 305 are illustrated as different software modules by way of example, they may be integrated in one software module.

The archive control information 303 is formed as an external file used in a program for realizing the function of the registration processing determination section 302, so that a determination criteria for processing can be changed simply by rewriting a new content into the file.

The contents of the archive control information 303 are stored in a system table (system information table 310) provided in the data server 104 for storing system information. When a service process of the registration processing determination section 302 is started, the archive control information 303 is read out from the system information table 310 and written in the intermediate server 103. When the contents of the archive control information 303 stored in the system information table 310 are changed, the archive control information 303 stored in the intermediate server 103 is also updated.

The registration processing determination section 302 reads out the archive control information 303 for each job information registration process, not from the data server 104, but from the file in the intermediate server 103, which makes it possible to perform data registration without lowering the processing efficiency. The data registration process is classified into two types: a first registration process executed by the job information and content information registration section 304 and a second registration process executed by the content information registration section 305. In the first registration process, job information and associated content information are both registered in the data server 104. On the other hand, in the second registration process, only the content information is registered.

A job information table 306 is a database table storing job information. A content management table 307 is a database table for managing IDs unique to respective job information items and IDs unique to respective content information items so as to associate the job information items with the respective content information items. A text information table 308 is a database table for managing text information. An image information table 309 is a database table for managing image information. The text information and the image information are subsets of the content information.

Text information is text (character)-based data in content information. Text data is obtained, using the OCR function of the image processing section 301, from image data acquired by the MFP 101, or directly obtained from the printer driver of the user PC 102. Further, when a job, such as e-mail transmission, is executed by the MFP 101, text data is obtained from character data of the body of an e-mail. These text (character) data obtained as mentioned are generically referred to as text information.

On the other hand, image information is image-related data in content information. Image information is obtained by the MFP 101 scanning an original or from the printer driver of the user PC 102. An optimal data format of image information is selected from JPEG, JBIG, TIFF, etc. according to a process to be executed by the apparatus.

The job information and content information registration section 304 performs data analysis on job information, and stores data of job attribute information and an associated job information ID in respective predetermined fields of the job information table 306. As for content information, an ID (content ID) for uniquely identifying a text data item and an image data item and a job information ID for uniquely identifying a job information item are stored in the content management table 307. The text data is stored in the text information table 308 together with the content ID. The image data is stored in the image information table 309 together with the content ID. The job information and the content information are stored in respective predetermined fields of the same content management table 307, for association between them.

The content information registration section 305 accesses the content management table 307, the text information table 308, and the image information table 309, and registers only content information. On the other hand, the job information and content information registration section 304 not only performs the same processing as performed by the content information registration section 305, but also accesses the job information table 306, and registers job information therein.

A job information item is identified by an associated job information ID in the job information table 306. As for content information associated with the job information, a text data item is identified by an associated content ID in the text information table 308, and an image data item is identified by an associated content ID in the image information table 309. The job information ID and the content ID are associated with each other by the content management table 307.

The content information registration section 305 registers content information associated with a job executed by the MFP 101, but not job information. The content information registered in the data server 104 by the content information registration section 305 is used to be referred to from job information associated with another job executed by the MFP 101 using the same content. The content information registration section 305 stores the content ID contained in the job information and the entity (image information and text information) of the content information in the content management table 307, the text information table 308, and the image information table 309. At this time, the job information ID in the content management table 307 remains null without being changed.

FIG. 6 is a diagram of a list of processing contents to be executed by the registration processing determination section 302 appearing in FIG. 5.

A processing content to be executed by the registration processing determination section 302 is determined based on the archive control information 303 read out from the system information table 310 in the data server 104 and stored in the intermediate server 103. Processing contents are roughly divided into registration target jobs 401 and non-registration target jobs 402. A registration target job 401 is a job designated by an auditor of the present system as an object to be registered, whereas a non-registration target job 402 is a job not designated by the auditor of the present system as an object to be registered. Registration of the registration target job 401 is performed by the job information and content information registration section 304.

On the other hand, in the case of the non-registration target job 402, a processing content to be executed at a later stage than the registration processing determination section 302 depends on a job type contained in the job information. When the job type is an input job (e.g. "send-scan") as denoted by reference numeral 403, the job is executed by the content information registration section 305. This is because the non-registration target job 402 does not require job information, and it suffices to register only content information.

When a job is a non-registration target job 402 and not an input job, it is not required to register data in the data server 104. In this case, therefore, job information and content information are discarded, and the process is terminated without execution of data registration.

FIG. 7 is a diagram showing the contents of the archive control information 303 appearing in FIG. 5.

The archive control information 303 stores, as a set of setting information items, the job type of an input job, the job type of an output job associated with the input job, and a setting value for identifying whether or not jobs of these job types are objects to be archived. In the illustrated example, the job type "fax-send" of the facsimile transmission job is set as a registration target job (job to be registered). In this case, the content information on the input job "send-scan" associated with the output job is also set to be registered so as to enable the content information to be referred to from the job record of the output job "fax-send".

On the other hand, an output job "email-send" is a non-registration target job. However, it is necessary to register content information on an input job "send-scan" associated with the output job "email-send". This is because there is a possibility of content information on an input job "send-scan" being linked from a job record of an output job "fax-send", as described hereinbefore.

Figure 8:
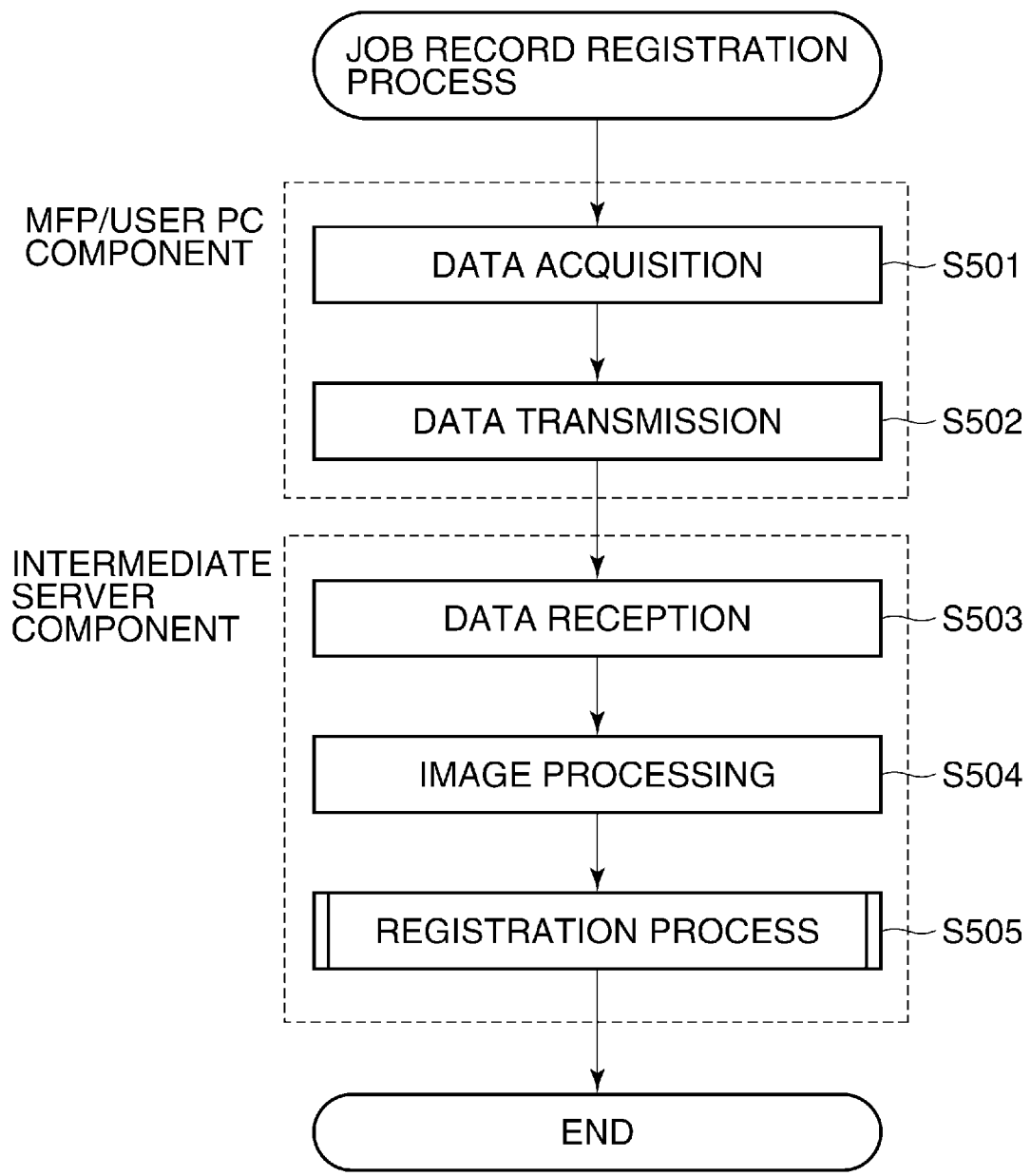
FIG. 8 is a flowchart of a job record registration process executed by the job record audit system in FIG. 1.

FIG. 8 is a flowchart of a job record registration process executed by the job record audit system in FIG. 1.

In FIG. 8, data acquisition in a step S501 and data transmission in a step S502 are executed by the agent function of the MFP 101 or the user PC 102. In the step S501, the agent function acquires job information and content information on an accepted job. Then, in the step S502, the MFP 101 sends the acquired job information and content information to the intermediate server 103.

Steps S503 to S505 are executed by the intermediate server 103. In the step S503, the intermediate server 103 (the CPU 201) receives the job information and the content information from the MFP 101. In the present embodiment, it is assumed that data transmission and reception between the MFP 101 and the intermediate server 103 is performed using general-purpose protocols of Web service.

Then, in the step S504, the image processing section 301 in the intermediate server 103 performs image processing, such as resolution conversion, data compression, and data format conversion, on the received content information.

In the step S505, the registration processing determination section 302, the job information and content information registration section 304, and the content information registration section 305 in FIG. 5 execute the above-mentioned data registration process. The data registration process executed in the step S505 will be described in detail with reference to FIG. 9.

Figure 9:
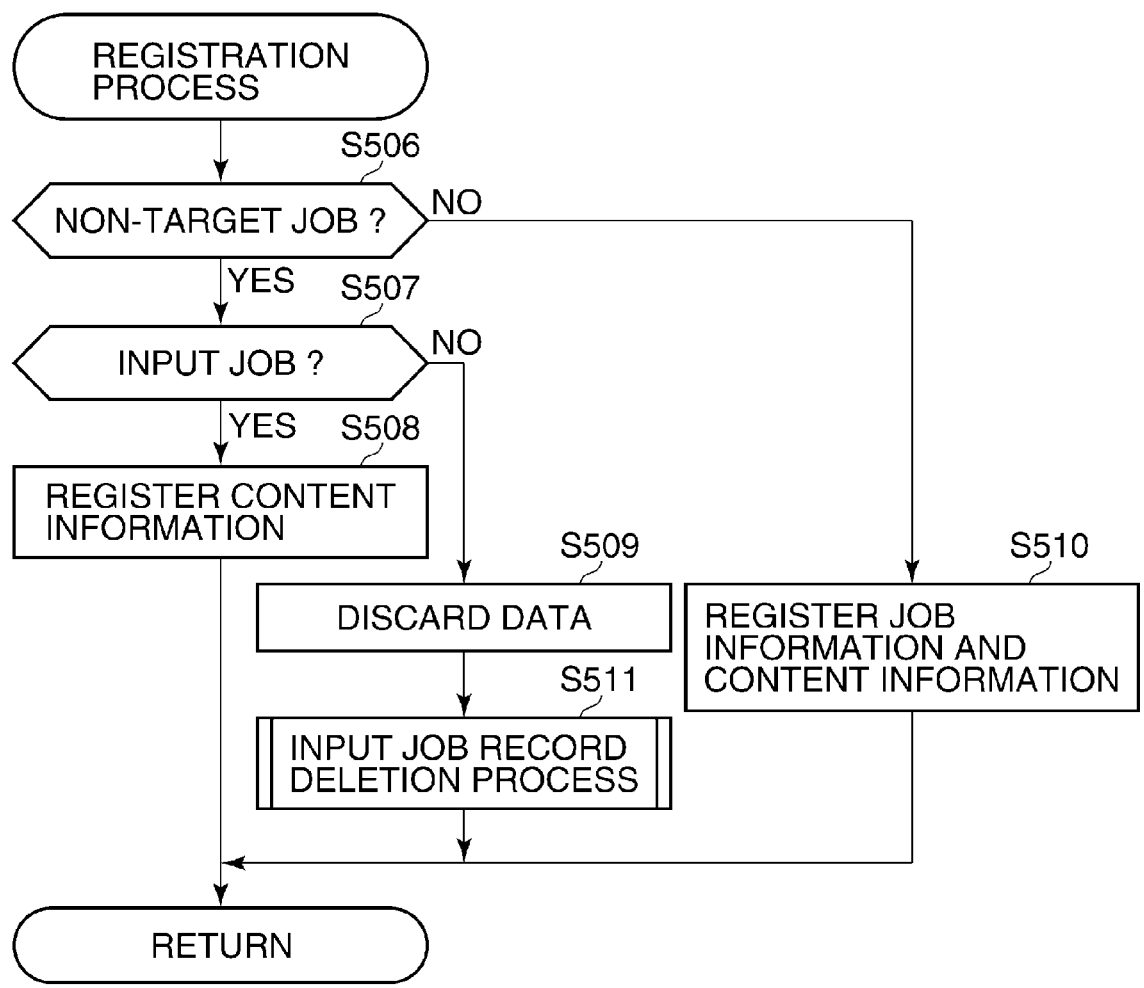
FIG. 9 is a flowchart showing details of a registration process in FIG. 8.

FIG. 9 is a flowchart showing details of the registration process in the step S505 in FIG. 8.

The registration processing determination section 302 refers to information indicative of a job type, which is contained in the job information, and the archive control information 303 to thereby determine whether or not the job information and the content information are on a non-registration target job (step S506). If it is determined that the job information and the content information are on a registration target job (NO to the step S506), the job information and content information registration section 304 registers these data items in the data server 104 (step S510), and then the process returns.

On the other hand, if the job information and the content information are on a non-registration target job (YES to the step S506), it is determined whether or not the job type contained in the job information is an input job (step S507). If the job type contained in the job information is an input job (YES to the step S507), the content information registration section 305 registers only the content information in the data server 104 (step S508). In other words, in the step S508, the job information is not registered in the data server 104.

On the other hand, if the job type contained in the job information is not an input job (NO to the step S507), the data is discarded without execution of the data registration process (step S509), and then the process proceeds to a step S511.

In the step S511, since the job record received by the intermediate server 103 is on an output job set as a non-registration target job, content information on an input job associated with the output job, which has already been registered, is deleted (input job record deletion process). The input job record deletion process executed in the step S511 will be described hereinafter with reference to FIG. 10.

Thus, a job record associated with a job (input job) whose content information is likely to be referred to from an associated output job is registered in the data server 104 even if the job is set as a non-registration target job, i.e. a job that is not to be registered in the data server 104.

Therefore, even an output job, such as the facsimile transmission job, which is set for registration, can have its content information properly registered in the data server 104, and thereby enabling the content information to be referred to afterwards. Further, as for a job which is a non-registration target job and at the same time an input job, job information associated therewith is not registered, so that it is possible to reduce the storage capacity of the data server 104.

Figure 10:
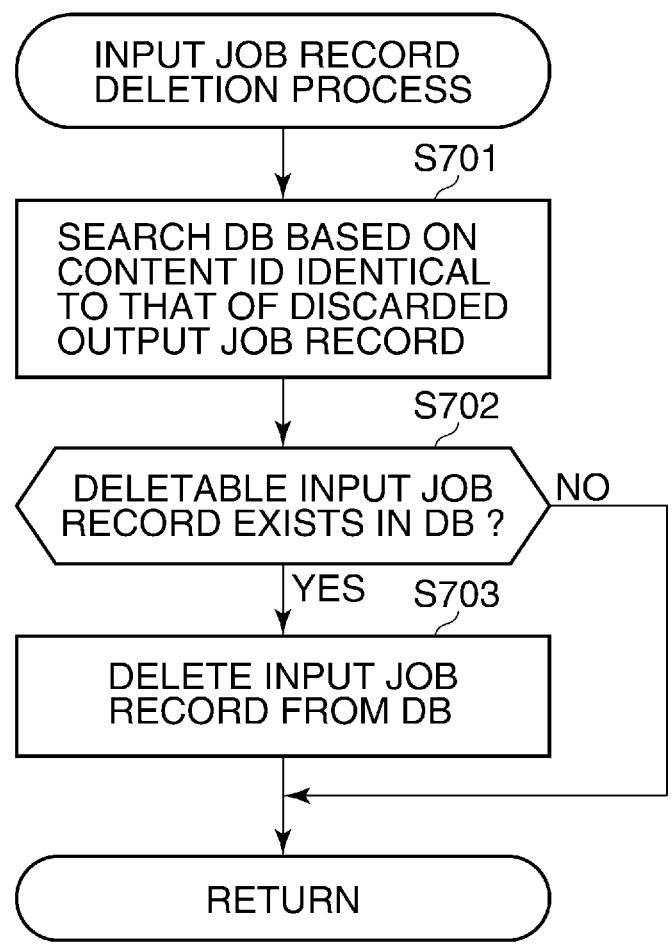
FIG. 10 is a flowchart showing details of an input job record deletion process in FIG. 9.

FIG. 10 is a flowchart showing details of the input job record deletion process in the step S511 in FIG. 9.

In a step S701, the data server 104 is searched for a content data item having the same content ID as that of the job record of the output job discarded in the step S509. This search may be performed directly by the intermediate server 103 or alternatively using the search server 105.

Then, it is determined in a step S702 whether or not deletable content information on an input job has been registered in the data server 104. The term "deletable content information on an input job" is intended to mean a job record of an input job which was registered in the data server 104 because of its possibility of being linked from an output job which is a registration target but was determined not to be linked from an output job which is a registration target.

Referring to FIG. 7, in the present embodiment, a job which has a possibility of being linked from "send-scan" is either "fax-send" or "email-send". The content information on the input job "send-scan", which has the possibility of being linked from the registration target output job "fax-send", is registered in the data server 104. However, when the output job "email-send" is received at the intermediate server as an output job linked to the content information on the input job "send-scan" (i.e. as an output job having the same content ID), it turns out that the registration of the content information on the input job "send-scan" was unnecessary. This is because since the input job "send-scan" is linked from the output job "email-send", it is made definite that there is no possibility that the input job "send-scan" will be linked from the registration target output job "fax-send". In other words, it can be said that the content information on the input job "send-scan" linked from the output job "email-send" is deletable. If there is deletable content information on an input job in the data server 104, the content information on the input job is deleted from input job records in a step S703.

By deleting the unnecessary content information on the input job as described above, it is possible to avoid accumulation of unnecessary data in the data server 104, which contributes to reduction of the storage capacity of the data server 104.

Figure 11:
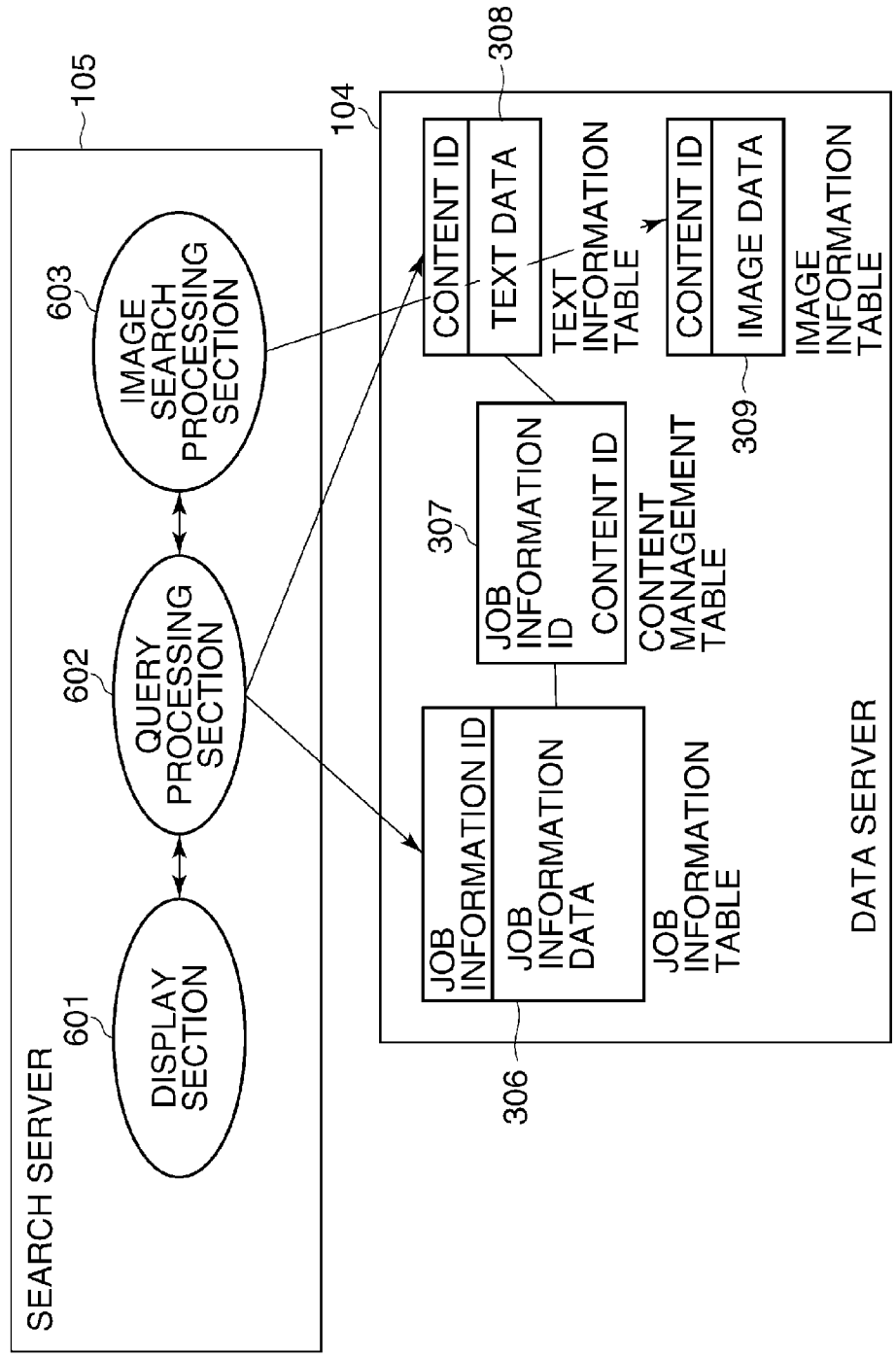
FIG. 11 is a schematic diagram showing the configuration of functional components that operate during search of job information and content information.

FIG. 11 is a schematic diagram showing the configuration of functional components that operate during search of job information and content information.

In FIG. 11, the search server 105 comprises a display section 601, a query processing section 602, and an image search processing section 603, as functional components for realizing a search process. These functional components are software modules that operate on the search server 105.

The search process is executed when job information and content information stored in the data server 104 are to be referred to. The auditor designates a search key associated with the job information and the content information and then searches the job information and the content information registered in the data server 104. The auditor performs an audit by referring to hit job information and content information.

Further, in the search process, it is possible to conduct a search using job attributes on job information, and conduct a full-text search or an image search on content information. Furthermore, a combination of these searches can be conducted, which makes it possible to improve user friendliness for audit of job information and content information.

The search of job information is executed on indices associated with respective values stored in the job information table 306. The search of text data is executed on indices associated with respective values stored in the text information table 308. On the other hand, the search of image data is executed on image feature value data (feature value information) stored in the feature value information table 311 in FIG. 5.

A job information item hit in the search process is identified by a job information ID. A text data item and an image data item are identified by a content ID. The content management table 307 stores job information IDs and content IDs in proper association therebetween. Therefore, by looking up the job information table 306 using a content ID, it is possible to obtain information on a job that generated a content information item associated with the content ID.

In FIG. 11, the display section 601 is a functional module for generating a user interface for a search application. The display section 601 is provided with an interface for inputting a search condition, which enables the user to designate an attribute query, a full-text query, an image query, or a combination of these logical conditions.

The display section 601 is also provided with a function of displaying search results. Search results are displayed on a screen on a job-by-job basis in a list form or in a thumbnail form. Further, the display section 601 is provided with a function of displaying job information and content information. For example, the user name of a user who designated a job, a job start date and time, the name of an apparatus which executed the job, and so forth are displayed as job information on the display section 601. As content information, text information contained in an image and the image itself are displayed on the display section 601.

The query processing section 602 is a functional module for converting search conditions designated via the display section 601 into an SQL query and making a query to the data server 104. Further, the query processing section 602 is provided with a function of receiving a result of processing executed by the data server 104 and sending the processing result to the display section 601.

In a case where only content information (text data or image data) on an input job is registered by the content information registration section 305, the input job is hit in the search process only when an output job that refers to the content information has been registered in the data server 104. However, when no output job that refers to the content information has been registered in the data server 104, it is judged that no job has been hit, and the result is normally processed.

Conventionally, a content information item is always registered in association with a job information item. For this reason, whenever a content information item is hit in the search process, a job information item associated with the content information item can be acquired as a search result. In the job record audit system of the present embodiment, however, the content information registration section 305 produces a state in which only a content information item is registered but a job information item is not. When such a search is conducted as will cause the content information item to be hit, an event occurs in which the content information item is hit, but there is no associated job to be displayed.

In the job record audit system of the present embodiment, even when the query processing section 602 cannot acquire any job record, it is not judged as an error. In a case where a content information item is hit, but no associated job information item is found, the query processing section 602 operates to acquire another job information item hit by search. The job information item acquired by the query processing section 602 in the search process is transferred to the display section 601 and is displayed on the screen.

The query processing section 602 conducts a search on job information by referring to the indexes on the values stored in the job information table 306, whereas it conducts a full-text search on text data by referring to the indexes on the values stored in the text information table 308. The query processing section 602 conducts a search on image data based on image feature value data (feature value information) stored in the feature value information table 311 in FIG. 5.

Image search processing requires calculation of a degree of similarity concerning image feature values using the image search processing section 603. In conducting an image search, the query processing section 602 accesses the image search processing section 603 to thereby execute a sequence of image search processing involving the similarity calculation. Further, in conducting a complex search as a combination of an attribute search, a full-text search, and an image search as well, the query processing section 602 and the image search processing section 603 cooperates with each other.

According to the above-described first embodiment, by providing the archive control information 303, a job record associated with a specific job type is set to be an object to be registered in the data server, and content information on an input job, which has turned out to be unnecessary, is deleted. This makes it possible to prevent unnecessary data from continuing to be registered in the data server, which contributes to reduction of the storage capacity of the data server.

Next, a second embodiment of the present invention will be described with reference to FIG. 12. The second embodiment is identical to the first embodiment in the configuration shown in FIGS. 1 to 8, and therefore description thereof is omitted, while denoting the same elements by the same reference numerals, respectively. The following description is given of points different from the first embodiment.

Figure 12:
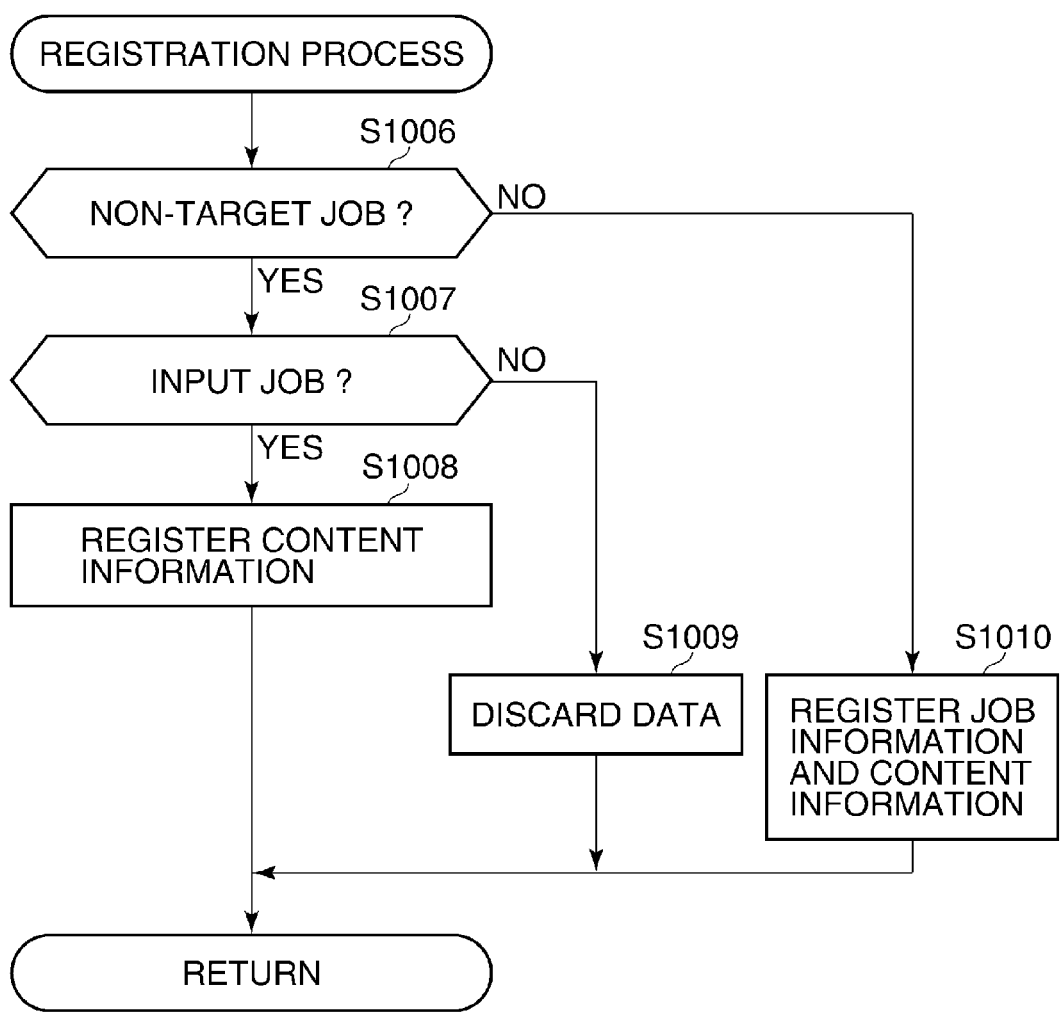
FIG. 12 is a flowchart of a job record registration process executed by a job record audit system including an information processing apparatus according to a second embodiment of the present invention.

FIG. 12 is a flowchart a job record registration process executed by a job record audit system including an information processing apparatus according to the second embodiment. This job record registration process is identical to the process described hereinabove with reference to FIG. 8, and the registration process in the step S505 corresponds to the process in FIG. 12.

Further, steps S1006 to S1010 in FIG. 12 correspond to the steps S506 to S510 in FIG. 9, but differently from the first embodiment, in the second embodiment, the process (input job record deletion process) executed in the step S511 in FIG. 9 is not included in the process shown in FIG. 12.

In the second embodiment, deletion of a job record is performed by the data server 104. Job records of jobs executed by the MFP 101 are each subjected to the job record registration process in FIG. 8 in the intermediate server 103 and are eventually accumulated in the data server 104. The data server 104 executes a job record deletion process in predetermined timing (e.g. at 0 o'clock every day). This job records deletion process corresponds to the input job record deletion process in FIG. 10. In the present process, a deletable job record stored in the data server 104 is searched for based on the archive control information 303 stored in the data server 104, and when a deletable job record is found, it is deleted.

According to the second embodiment, it is possible to obtain the same advantageous effects as provided by the first embodiment. Further, the intermediate server 103 is not used to delete job records, and therefore the intermediate server 103 can be dedicated to job record registration processing, which makes it possible to improve the throughput of the job record registration.

Although in the above-described embodiments, the system is configured such that the intermediate server 103, the data server 104, and the search server 105 are separately provided independent of each other, this is not limitative, but the system may be configured as an information processing apparatus integrating the three servers.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149794, filed Jun. 24, 2009, which is hereby incorporated by reference herein in its entirety.

What is claimed is:

1. An information processing apparatus that is connectable to an image processing apparatus arranged to execute a plurality of types of jobs for processing images, and a data server, via a network, comprising:
   a reception unit adapted to receive audit information concerning a job executed by the image processing apparatus, from the image processing apparatus, the audit information containing attribute information indicative of attributes of the job and content information on an image processed by the job;
   a registration unit adapted to register, in the data server, at least one of the attribute information and the content information contained in the audit information received by said reception unit;
   a determination unit adapted to determine a type of the job which the audit information received by said reception unit concerns; and
   a control unit adapted to control, according to the type of the job determined by said determination unit, whether to cause said registration unit to register, in the data server, the attribute information and the content information contained in the audit information received by said reception unit or to cause said registration unit to register the content information in the data server without the attribute information being registered therein;
   wherein at least one of the reception unit, the registration unit, the determination unit and the control unit are implemented, at least in part, by at least one hardware processor connected to a memory.

2. The information processing apparatus according to claim 1, wherein said determination unit is arranged to determine a type of a job based on information indicative of a type of a job contained in the attribute information.

3. The information processing apparatus according to claim 1, further comprising a setting information storage unit adapted to store setting information defining information to be registered in the data server, out of audit information received by said reception unit, and
   wherein said control unit is arranged to execute control based on the type of the job determined by said determination unit and the setting information stored in said setting information storage unit.

4. The information processing apparatus according to claim 3, wherein the setting information is rewritable by the data server.

5. The information processing apparatus according to claim 3, wherein in the setting information, there is set information for identifying a type of a job of which the attribute information and the content information contained in the audit information are to be registered in the data server.

6. The information processing apparatus according to claim 1, wherein said control unit is arranged to cause said registration unit to cause the attribute information contained in the audit information received by said reception unit, and information for referring to content information already registered in the data server, to be registered in the data server.

7. A method of controlling an information processing apparatus that is connected to an image processing apparatus capable of executing a plurality of types of jobs for processing images, and a data server, via a network, comprising:

receiving audit information concerning a job executed by the image processing apparatus, from the image processing apparatus, the audit information containing attribute information indicative of attributes of the job and content information on an image processed by the job;

registering, in the data server, at least one of the attribute information and the content information contained in the audit information;

determining a type of the job which the received audit information concerns; and controlling, according to the type of the job determined by the determining step, whether to register, in the data server, the attribute information and the content information contained in the audit information or to register the content information in the data server without the attribute information being registered therein.

8. A non-transitory computer-readable storage medium storing a computer-executable program for causing a computer to execute a method of controlling an information processing apparatus that is connected to an image processing apparatus capable of executing a plurality of types of jobs for processing images, and a data server, via a network, wherein the method comprises:

receiving audit information concerning a job executed by the image processing apparatus, from the image processing apparatus, the audit information containing attribute information indicative of attributes of the job and content information on an image processed by the job;

registering, in the data server, at least one of the attribute information and the content information contained in the audit information;

determining a type of the job which the received audit information concerns; and controlling, according to the type of the job determined by the determining step, whether to register, in the data server, the attribute information and the content information contained in the audit information or to register the content information in the data server without the attribute information being registered therein.

* * * * *